Nov. 3, 1931.  H. O. G. SCHILLING  1,830,720
APPARATUS FOR APPORTIONING OR DIVIDING MATERIAL IN PRESCRIBED PROPORTIONS
Filed Oct. 11, 1929
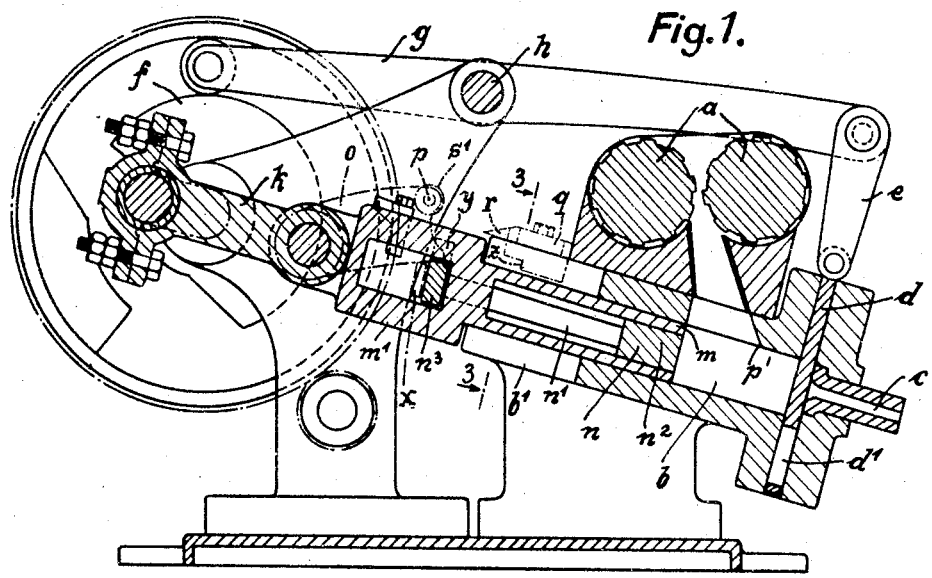
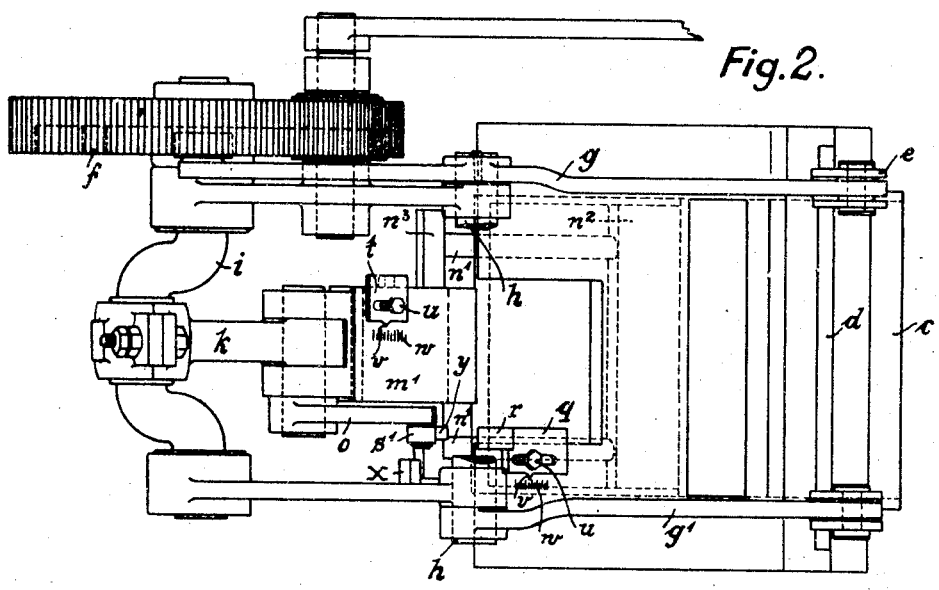
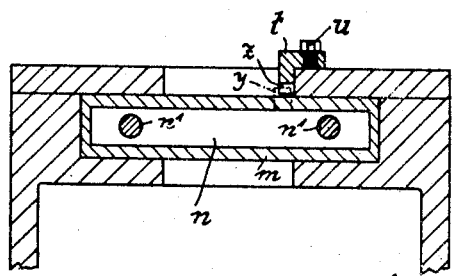
Inventor
Hugo Otto Georg Schilling
By
Langner, Parry, Card & Langner
Attorneys Patented Nov. 3, 1931

1,830,720

UNITED STATES PATENT OFFICE

HUGO OTTO GEORG SCHILLING, OF HAMBURG, GERMANY, ASSIGNOR OF ONE-HALF TO ALFRED GUSTAV PUHL, OF HAMBURG, GERMANY

APPARATUS FOR APPORTIONING OR DIVIDING MATERIAL IN PRESCRIBED PROPORTIONS

Application filed October 11, 1929, Serial No. 399,040, and in Germany October 18, 1928.

There are already known devices for apportioning or dividing material such as dough for pastry or like material to be filled into tubes and the like in prescribed proportions, in which the material is pressed into a chamber containing a movable piston and having an opening adapted to be temporarily closed by a slide, through which opening the material is extruded by the piston.

An object of the present invention is to provide an apparatus of this kind whereby the amount of material apportioned may be adjusted or exactly regulated. With this object in view provision is made whereby one part or section of the piston which has to advance the material, is releasable in such manner that on the piston performing its stroke the said part or section is adapted to recede under the influence of the pressure exercised on the material until it is entrained by a stop arranged adjustably on the piston. Corresponding to the adjustment of this stop the released movable part of the piston may recede more or less to allow more or less material to enter the gap afforded by the piston on its last advance, whereby the amount of material advanced is correspondingly reduced. The part released from the piston is entrained on the initial forward movement by an arm pivoted to this piston or its driving means in order to secure operation on the material over the entire surface of the piston. For securing release of the said part of the piston at the proper time an adjustable cam is provided on the frame for releasing the entraining arm. This cam is preferably given an inclined surface in the path of a stud or roller mounted on the entraining arm in order to withdraw the arm from the part of the piston to be released by engaging the said inclined surface.

Fig. 1 of the accompanying drawings is a vertical section, and

Fig. 2 a plan of the apparatus.

Fig. 3 is a section on the line 3—3 of Fig. 1.

As is known, in apparatus of this kind the material delivered by the rollers $a$ is continuously pressed into the chamber $b$. At the outer end of the chamber $b$ there is an opening or nozzle $c$ which can be temporarily closed by the slide $d$. This slide is connected by a link $e$ with a two-armed lever $g$ adapted to be operated by a cam $f$. The slide $d$ is also connected by a link $e'$ with a lever $g'$ mounted on the same shaft $h$ as the lever $g$. The cam $f$ is mounted on a crank shaft $i$, which is connected by a connecting rod $k$ with a piston $m$ the forward end of which reciprocates within the chamber $b$. The operation of the slide $d$ is timed to correspond to the movement of the piston $m$ by the gearing described, so that the slide $d$ presents the opening $d'$ to the nozzle $c$, at the right time to allow the apportioned mass to be extruded. One part $n$ of the piston $m$ is slidable within the piston $m$. The part $n$ of the piston $m$ within the chamber $b$ is sectional, including two heads $n^2$ and $n^3$ connected by two rods $n'$, the head $n^2$ extending to the outer piston-surface $(m)$ having a close fit within the main piston $m$. For the head $n^3$ exterior to the casing $b'$ of the chamber a gap is provided in the part $m'$ unitary with the piston part $m$ (Fig. 2). An arm $o$ engages the head $n^3$ of the piston part $n$ to entrain the piston part $n$ in the movement of the piston $m$. When the piston is operating in such manner that the arm $o$ constantly engages the head $n^3$, the material between the edge $p'$ of the inlet of the chamber $b$ and the slide $d$ will be extruded through the nozzle $c$ as soon as the slide is withdrawn. This operation will take place when large size pieces of dough or the like are required. In order to obtain smaller pieces means are provided to withdraw the arm $o$ from engagement with the head $n^3$ so soon as the front face of the piston passes the edge $p'$. These means comprise an adjustable cam $q$ having a cam face $r$ at its forward end. This cam $q$ is so adjusted that on the forward movement of the piston a stud $s$ on the arm $o$ or an antifriction roller $s'$ mounted on the stud $s$ engages the cam face $r$, and, when running thereon, releases the arm $o$ from engagement with the head $n^3$, which thereupon will allow the piston part $n$ to recede under the action of the pressure exercised on the material, thus reducing the amount extruded through the nozzle $c$, because the gap within the piston $m$ will receive a corresponding amount of the material. In order to regulate the amount of material entering the said gap an adjustable stop $t$ is mounted on the projecting part $m'$ of the piston $m$, said stop projecting into the path of the receding head $n^3$. As soon as the stop $t$ engages the head $n^3$, the receding piston part $n$ finds an abutment and therefore can no longer recede. Beginning from the zero position the cam $q$ and the stop $t$ will be adjusted corresponding to the amount of the material to be apportioned, so that from the moment the arm $o$ is lifted by the cam $q$ up to the point at which the head $n^3$ is engaged by the stop $t$ the distance is determined for which the piston part $n$ may recede to provide a correspondingly large gap within the piston $m$. It has been ascertained that the amount of material to be apportioned can be regulated to the utmost accuracy by the aid of the means described above.

It is advisable to arrange on the cam $q$ and the adjustable stop $t$, which can be tightened by a screw $u$, a pointer $v$ movable relatively to the scale $w$.

In order to return the retractible part $n$ of the piston $m$ to its original position so that its front face coincides with that of the main part of the piston, a stop $x$ is provided on the frame, against which stop the head $n^3$ may abut on its return movement, holding it in its position until the piston $m$ returns also to its normal position.

When very soft or liquid material is to be apportioned, it is advisable to provide on the head $n^3$ a further stop $y$ adapted to abut against a surface $z$ of the cam $q$ and be retained thereby to obtain the desired gap within the piston.

I claim:

An apparatus for apportioning or dividing material comprising a chamber, a piston in said chamber for extruding material from said chamber, means for driving said piston, said chamber having an opening, a slide normally closing said opening, said piston comprising a plurality of sections, one section being connected operatively with another section in such manner that its stroke is adjustable independently of the stroke of said other sections, said sections cooperating in extruding material from said chamber, an arm pivoted to said means for driving said piston, a head against which said arm normally bears mounted on the piston rod of the releasable piston section, said arm serving to limit the stroke, a stop cooperating with an adjustable stop on the frame for releasing the arm from said head and a second adjustable stop arranged on the piston section of the fixed portion of the piston and adapted to project into the path of the releasable piston section.

In testimony whereof I have signed my name to this specification.

HUGO OTTO GEORG SCHILLING.